(12) United States Patent
Platus

(10) Patent No.: US 9,261,155 B2
(45) Date of Patent: Feb. 16, 2016

(54) COMPACT VERTICAL-MOTION ISOLATOR

(71) Applicant: MINUS K. TECHNOLOGY, INC., Inglewood, CA (US)

(72) Inventor: David L. Platus, Santa Monica, CA (US)

(73) Assignee: MINUS K. TECHNOLOGY, INC., Inglewood, CA (US)

( * ) Notice: Subject to any disclaimer, the term of this patent is extended or adjusted under 35 U.S.C. 154(b) by 115 days.

(21) Appl. No.: 14/070,787

(22) Filed: Nov. 4, 2013

(65) Prior Publication Data

US 2015/0122970 A1    May 7, 2015

(51) Int. Cl.
     *F16F 3/10*      (2006.01)
     *F16F 15/04*      (2006.01)
     *F16F 3/02*      (2006.01)

(52) U.S. Cl.
CPC ... *F16F 3/10* (2013.01); *F16F 3/02* (2013.01); *F16F 15/04* (2013.01); *F16F 15/046* (2013.01); *F16F 2228/063* (2013.01)

(58) Field of Classification Search
CPC .......... F16F 15/02; F16F 15/04; F16F 15/06; F16F 15/0275; F16F 2228/063; F16F 15/046; E04B 1/98; E04H 9/021; F16M 5/00; F16M 7/00
See application file for complete search history.

(56) References Cited

U.S. PATENT DOCUMENTS

| | | | | |
|---|---|---|---|---|
| 4,527,365 A * | 7/1985 | Yoshizawa | ................ | F16F 7/08 267/154 |
| 4,565,039 A * | 1/1986 | Oguro | ..................... | E02D 27/34 248/567 |
| 5,178,357 A | 1/1993 | Platus et al. | | |
| 5,310,157 A * | 5/1994 | Platus | ..................... | F16F 3/026 248/619 |
| 5,370,352 A | 12/1994 | Platus | | |
| 5,390,892 A | 2/1995 | Platus et al. | | |
| 5,549,270 A * | 8/1996 | Platus | ..................... | F16F 3/026 248/619 |
| 5,669,594 A * | 9/1997 | Platus | ..................... | F16F 3/026 248/619 |
| 5,794,909 A | 8/1998 | Platus et al. | | |
| 5,833,204 A * | 11/1998 | Platus | ..................... | F16F 3/026 248/619 |
| 6,676,101 B2 * | 1/2004 | Platus | ..................... | F16F 15/02 248/566 |
| 8,132,773 B1 * | 3/2012 | Platus | ..................... | F16F 15/02 248/618 |
| 2011/0278425 A1 | 11/2011 | Park | | |

(Continued)

FOREIGN PATENT DOCUMENTS

| | | |
|---|---|---|
| CN | 102678804 A | 9/2012 |
| CN | 102619916 B | 9/2013 |
| WO | 2013039401 A1 | 3/2013 |

OTHER PUBLICATIONS

International Search Report; PCT/US2014/063481; Feb. 12, 2015.

*Primary Examiner* — Ryan Kwiecinski
(74) *Attorney, Agent, or Firm* — Fulwider Patton LLP

(57) ABSTRACT

A vertical-motion vibration isolator utilizes negative-stiffness-producing mechanism which includes a plurality of compressed flexures, each having a particular length in the compressed direction of the flexure and being oriented in a horizontal direction, wherein the plurality of compressed flexures are positioned relative to each other such that the length of each compressed flexure substantially overlaps the length of each of the other compressed flexures. At least some of the plurality of compressed flexures can be positioned in a stacked arrangement. The arrangement of compressed flexures forming a portion of the negative-stiffness mechanism can reduce the size of the isolator without compromising vibration isolation performance.

20 Claims, 9 Drawing Sheets

(56) References Cited

U.S. PATENT DOCUMENTS

| | | | |
|---|---|---|---|
| 2014/0048240 A1* | 2/2014 | Platus | B64G 1/50 165/185 |
| 2014/0048989 A1* | 2/2014 | Platus | F16F 15/04 267/140.5 |
| 2015/0014510 A1* | 1/2015 | Dunning | F16F 15/073 248/618 |

* cited by examiner

COMPACT VERTICAL-MOTION ISOLATOR

BACKGROUND OF THE INVENTION

The present invention relates generally to suspension systems for isolating and reducing the transmission of vibratory motion between an object or payload and a base and, more particularly, to a compact vibration isolator which exhibits low stiffness in the direction of the weight load to effectively reduce the transmission of vibrations between the object and the base. The present invention represents improvements over my previous isolators which utilize negative-stiffness mechanisms to produce low vertical natural frequencies and which rely on a principle of loading a particular elastic structure which forms the isolator or a portion of it to approach the elastic structure's point of elastic instability.

The problems caused by unwanted vibration on equipment, devices and processes that are extremely motion sensitive have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, shortcomings and disadvantages associated with these particular prior art isolation systems which prevent them from obtaining low system natural frequencies and from limiting internal structural resonant responses to low values while providing high isolation performance at the higher frequencies.

These shortcomings and disadvantages of prior art systems were addressed through the development of novel vibration isolation systems devices described in U.S. Pat. No. 5,530,157, entitled "Vibration Isolation System" issued May 10, 1994, U.S. Pat. No. 5,370,352, entitled "Damped Vibration System" issued Dec. 6, 1994, U.S. Pat. No. 5,178,357, entitled "Vibration Isolation System" issued Jan. 12, 1993, U.S. Pat. No. 5,549,270, entitled "Vibration Isolation System" issued Aug. 27, 1996, U.S. Pat. No. 5,669,594, entitled "Vibration Isolation System" issued Sep. 23, 1997, U.S. Pat. No. 5,833,204, entitled "Radial Flexures, Beam-Columns and Tilt Isolation for a Vibration Isolation System issued Nov. 10, 1998, and Improved Vibration Isolation Systems, Ser. No. 13/587,135 filed on Aug. 16, 2012, which are all hereby incorporated by reference in this present application. These vibration isolators exhibit low stiffness, high damping to limit resonant responses of the composite system, effective isolation at the higher frequencies, and can provide high isolator internal structural resonant frequencies.

The particular vibration isolation systems described in these patents provide versatile vibration isolation by exhibiting low stiffness in an axial direction (generally the direction of the payload weight) and any direction substantially transverse to the axial direction (generally a horizontal direction), and may provide tilt or rotation about three mutually perpendicular axes. The present invention, however, is directed only to isolators used to isolate vibratory motion in the axial or vertical direction. It should be appreciated, however, that the present invention could be connected in series with a horizontal-motion isolator and/or a tilt-motion isolator to provide bi-directional or omni-directional isolation as well. In subsequent discussions, an axial-motion isolator will be referred to as a vertical-motion isolator, and a system using multiple axial-motion isolators will be referred to as the vertical-motion isolation system.

In the embodiments described in the above-noted patents, the isolators rely on a particular principle of loading a particular elastic structure which forms the isolator or a portion of it (the loading being applied by either the supported weight or by an external loading mechanism) to approach the elastic structure's point of elastic instability. This loading to approach the point of elastic instability, also called the "critical buckling load" of the structure, causes a substantial reduction of either the vertical or the horizontal stiffness of the isolator to create an isolation system that has low stiffness in the vertical and in any horizontal direction, and increases the damping inherent in the structure. While stiffness is reduced, these isolators still retain the ability to support the payload weight.

In the event that the load on the elastic structure is greater than the critical buckling load, the excessive load will tend to propel the structure into its buckled shape, creating a "negative-stiffness" or "negative-spring-rate" mechanism. By combining a negative-stiffness mechanism with a spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine-tuned" to the particular stiffness desired.

These above-described isolators provide excellent devices for isolating or reducing the transmission of vibratory motion between an object and the base. It would be particularly beneficial if such vertical-motion isolators which rely on this principle of loading the structure to approach its point of elastic instability could be made in a more compact size and shape which may be more suitable for certain vibration isolation applications. While a more compact geometry would be beneficial, it is important that the performance of such vertical-motion isolators not be compromised. The present inventions solve these and other needs.

SUMMARY OF THE INVENTION

The present invention provides novel and significant improvements in the design of vertical-motion isolators which utilize a negative-stiffness-producing mechanism that includes compressible flexures that can be loaded to exceed their point of elastic instability and thereby remove positive stiffness from a support spring. The present invention provides an arrangement of these flexures such that the size of the isolator can be compacted without compromising the vibration isolating performance of the isolator. In this regard, the present invention provides a "stacked" or "side-by-side" arrangement of the flexures whereby the assemblage of flexures can reduce the overall width of the vertical-motion isolator since the lengths of each flexure overlies the lengths of the other flexure(s) while still allowing the flexures to be operatively connected together to permit the negative-stiffness-producing mechanism to simultaneously compress each flexure to exceed its point of elastic instability and remove stiffness from the support spring.

For the purpose of this application, the length of a flexure is measured in the direction in which the flexure is compressed. Each flexure also has a width and a thickness and the flexures lie in horizontal planes defined by the length and width directions of the flexure so that the thickness is measured in a vertical direction. Further, the thickness of the flexure will usually be much less than the length or width of the flexure over at least part of its length so that the flexure can experience bending in a vertical plane as the isolator displaces in the vertical direction. A stacked arrangement of the flexures refers to an arrangement in which the flexures are positioned one above the other and a side-by-side or lateral arrangement of the flexures refers to an arrangement in which the flexures are positioned relative to each other with their length directions substantially parallel and spaced in the direction in which their widths are measured.

Previously vertical-motion isolators described, for example, in U.S. Pat. Nos. 5,549,270; 5,669,594 and 5,833,204, utilize a main support spring to support the payload weight and a negative-stiffness mechanism including compressed flexure assemblies that connect at their inner ends to a center hub and at their outer ends to other structural elements (a rigid support on one side of the isolator and an upright flexing assembly on the other side of the isolator) forming the isolator. Accordingly, the length between the outer ends of these flexures dictate in large part the dimension of the isolator in the length direction of the flexures. The present invention changes the spatial arrangement of these flexures by allowing each flexure to be spaced apart from each other in the vertical direction (a stacked arrangement) or in their side-by-side direction so that the length of each flexure substantially overlaps or overlies the length of the other flexures. Accordingly, this arrangement of the flexures substantially reduces the overall length between the ends of the compressed flexures. The present invention provides a compact structure which allows the flexures to be mounted in a stacked or side-by-side arrangement while allowing each flexure to be properly loaded by the negative-stiffness-producing mechanism without compromising the performance of the isolator.

The length of the compressed flexures in their compressed direction has a significant influence on the design of the isolator and often establishes in large part the dimension of the isolator in the compressed direction of the flexures. Their effect on the isolator dimension in the compressed direction of the flexures has been the case for previous negative-stiffness isolators as described, for example, in U.S. Pat. Nos. 5,549,270; 5,669,594; and 5,833,204, since two compressed flexures have been positioned end-to-end in the embodiments described in these patents.

Negative-stiffness isolators exhibit a nonlinear behavior for displacement of the isolator in the vertical direction and, as a result, the vertical natural frequency of the isolator increases as the isolator is displaced from its center position. The center position corresponds to the position in which the flexures are substantially straight and undeformed in bending. This increase in natural frequency reduces the isolation performance. This effect is more pronounced for lower natural frequencies. As a result, negative stiffness isolators have a limited vertical range of motion in which they can operate, particularly when the vertical natural frequencies are very low. An increase in the length of the flexures in their compressed direction reduces this nonlinear effect and allows the isolators to operate with a larger vertical displacement range, particularly for very low natural frequencies. Longer compressed flexures also enable the isolators to more easily achieve very low natural frequencies. These very low natural frequencies enable negative-stiffness isolators to isolate lower frequency vibrations than most all other vibration isolators on the market and they also improve the isolation efficiency for vibrations over a wide range of frequencies typical of building and floor motions compared with most other vibration isolators on the market.

The present invention offers a significant improvement in negative-stiffness vibration isolators by enabling the isolators to be more compact without having to reduce the length of the compressed flexures with the resulting degradation in performance that would result. This invention also offers the capability of significantly higher vertical displacement ranges at very low natural frequencies with significantly more compact isolators and also the ability to achieve much lower natural frequencies with more compact isolators than previously possible.

In one aspect of the present invention, the isolator includes a support spring for providing positive stiffness in the vertical direction and having force-supporting capability in the vertical direction for supporting the object and a negative-stiffness-producing mechanism operatively connected with the support spring. The support spring and the negative-stiffness-producing mechanism combine to produce the low vertical stiffness of the isolator. In this aspect, the negative-stiffness-mechanism includes a plurality of compressed flexures, each compressed flexure having a particular length in the compressed direction of the flexure and being oriented in a horizontal direction, wherein the plurality of compressed flexures are positioned relative to each other such that the length of each compressed flexure substantially overlaps or overlies the length of each of the other compressed flexures. At least some of the plurality of compressed flexures can be positioned in a stacked arrangement. A center hub assembly operatively connects the plurality of compressed flexures of the negative-stiffness-producing mechanism to the support spring. The length of each compressed flexure of the negative-stiffness-producing mechanism and the center hub assembly can substantially overlap each other so that the compressed flexures and the center hub assembly occupy substantially the same space as the compressed flexures.

In another particular form, the isolator utilizes a negative-stiffness mechanism comprises at least two compressed flexures, wherein the two compressed flexures and any additional compressed flexures in the negative-stiffness-producing mechanism substantially overlap one another in the compressed direction of the flexures so that all of the compressed flexures in the negative-stiffness-producing mechanism substantially occupy the same space in the compressed direction of the flexures. In this regard, the length of each compressed flexure at least partially overlies the length of the other compressed flexures. This overlap of compressed flexures still allow the flexures to remain operatively connected with each other. Each of the flexures includes an end which is attached to a composite center hub and another end which is attached either to a rigid support block that extends upward from a base platform or a flexure assembly attached to the base platform that is designed to provide essentially rigid support in the vertical direction and in the horizontal direction in the plane of the flexure assembly and flexible support in the horizontal direction transverse to the flexure assembly.

In another aspect of the invention, the negative-stiffness-producing mechanism includes a mechanism for placing the compression on all of the compressed flexures simultaneously. In another aspect, the compressed flexures are stacked one above the other while in another aspect the compressed flexures are placed in a substantially lateral or side-by-side arrangement.

In another aspect of the invention, the compressed flexures of the negative-stiffness-producing mechanism and the center hub assembly substantially overlap each other so that the compressed flexures and the center hub assembly occupy substantially the same space in the compressed direction of the flexures. In another aspect, the center hub assembly may include a horizontally oriented center hub plate having a top side and a bottom side, wherein at least one compressed flexure is mounted to the top side of the center hub plate and at least one compressed flexure is mounted to the bottom side of the center hub plate.

In one particular embodiment, the composite center hub assembly includes an upper spring support which remains in contact with one end of the main support spring, a top mounting plate for supporting the object to be isolated from vibrations and at least one center hub plate stacked between the upper spring support and top mounting plate. The upper spring support, center hub plate and top mounting plate are connected together to form the composite center hub structure. The center hub plate is used to mount the ends of the flexures thereto. In another aspect of the invention, a second center hub plate can be used to mount additional flexures in order to increase the number of flexures that can be provided on the isolator. In this aspect of the invention, the top mounting plate, the pair of center hub plates and upper spring support are connected together to form the composite center hub assembly. In one particular aspect of the present invention, a pair of center hub vertical plates can be fastened to opposite sides of the upper spring support, the center hub plate(s) and the top mounting plate to provide the connection between these components. Alternatively, vertical spacers (described below) could be utilized to connect the top mounting plate, center hub plate(s) and upper spring support together.

In yet another aspect of the invention, the negative-stiffness-producing mechanism includes a first set of flexures and a second set of flexures, wherein each set of flexures consist of at least two flexures that are vertically spaced apart from each other and are operatively connected by a single plate that forms a part of the center hub. The first set of flexures is operatively connected to the second set of flexures to create a negative-stiffness-producing mechanism which operates in a substantially lateral or side-by-side arrangement. The flexures of the first set can be spaced laterally apart from the flexures in the second set in a horizontal direction that is the front-to-back direction of the isolator. This arrangement creates spaces between the flexures which allow vertical spacers to extend thereto to be mounted to an upper spring support, the center hub plate and a top mounting plate forming the center hub assembly. All of the flexures in the first set and the second set are operatively connected so that the compressive-force-producing mechanism applies the compressive force to all of the flexures simultaneously to exceed their critical buckling loads and cancel or nearly cancel the positive stiffness of a support spring.

The present invention represents improvements over my previous vertical-motion isolators since a more compact unit can be created without compromising vibration isolation performance. Other features and advantages of the present invention will become apparent from the following detailed description when taken in conjunction with the accompanying drawings which illustrate, by way of example, the principles of the present invention.

DETAILED DESCRIPTION OF THE PREFERRED EMBODIMENTS

Figure 1:
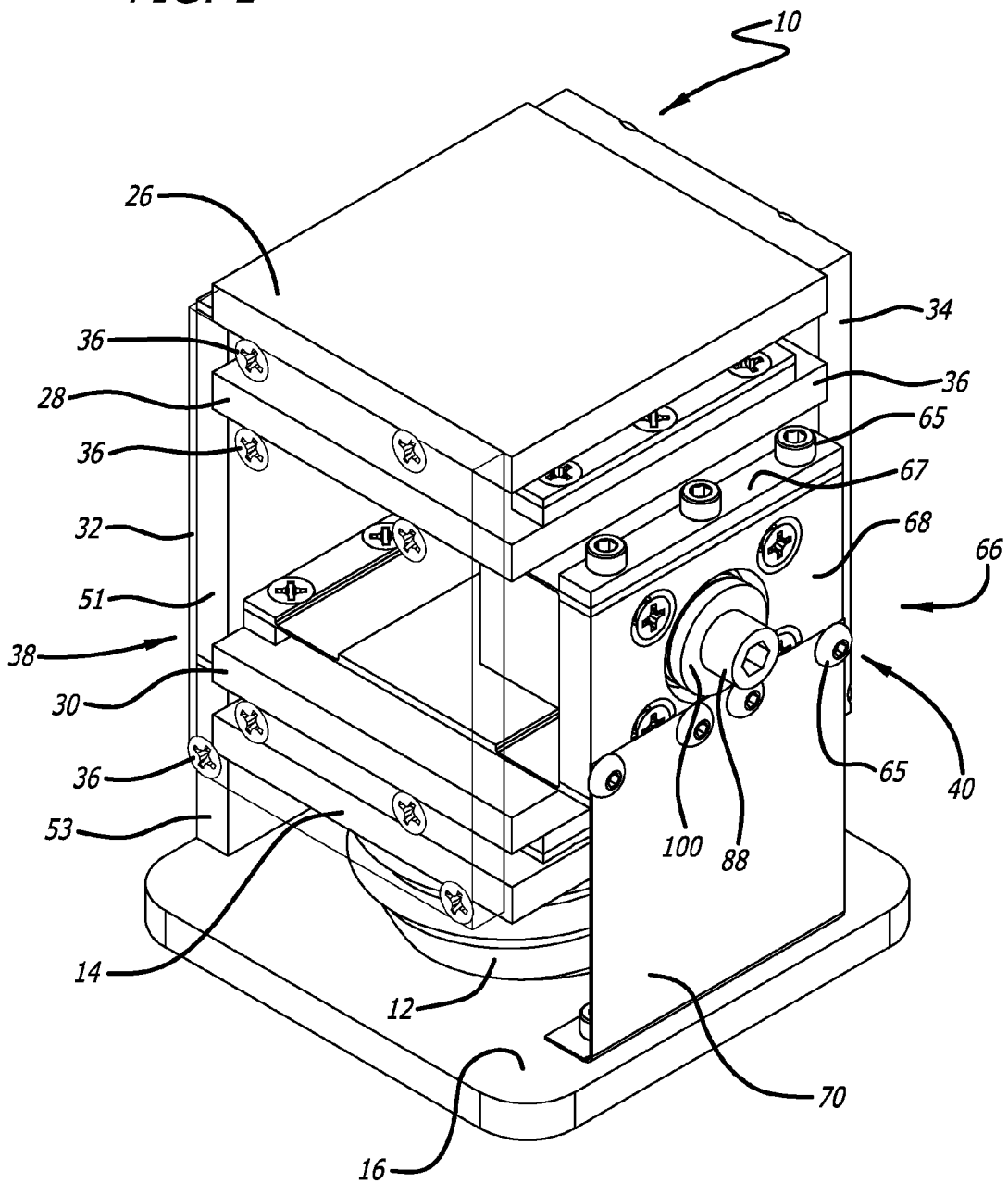
FIG. 1 is a perspective view of one embodiment of a compact vertical-motion vibration isolator made in accordance with the present invention.

FIGS. 1-5 show one embodiment of a compact vertical-motion isolator 10 made in accordance with the present invention. The embodiment of the vertical-motion isolator 10 of FIGS. 1-5 is designed to support a payload (not shown) relative to a foundation to reduce the transmission of axial or vertical vibrations (motion) between the payload and foundation.

The compact vertical-motion isolator 10 of the present invention includes a support member in the form of a main support spring 12 that is operatively connected between an upper spring support 14 and a base platform 16 that sits on the foundation 18. This base platform 16 may include leveling screws (not shown) which could be used for leveling the base platform 16 relative to the foundation 18. The upper spring support 14 includes a recess 20 for receiving one end 22 of the support spring 12. The other end 24 of the support spring 12 remains in contact with the base platform 16.

A top mounting plate 26 is coupled to the upper spring support 14 and is used to support the object (not shown) to be isolated from vibrations. A pair of center hub plates 28 and 30 are disposed between the top mounting plate 26 and the upper spring support 14. These center hub plates 28 and 30 are used to mount the flexures of the negative-stiffness-producing mechanism which will be described in greater detail below. A pair of center hub vertical plates 32 and 34 located along opposite edges of the top mounting plate 26, the center hub plates 28 and 30 and the upper spring support 14 are utilized to connect these components together. In FIG. 1, the vertical plate 32 is shown transparent so that the components behind it can be seen better. These center hub vertical plates 28 and 30 can be attached to these components using, for example, fasteners such as screws 36. The combination of these components form what will be herein referred to as the center hub assembly 38. It should be appreciated that the top mounting plate 26 may not be connected to the center hub assembly 38 in any of the disclosed embodiments if the center hub assembly 38 is to be connected to a another component or instrument such as horizontal-motion isolator or tilt-motion isolator that would extend above the center hub assembly 38.

A negative-stiffness-producing mechanism 40 is operatively connected with the support spring 12 via the center hub assembly 38 to cancel stiffness from the support spring 12. The negative-stiffness-producing mechanism 40 includes a first flexure 42 and a second flexure 44 which are operatively connected with each other in order to simultaneously receive the compressive force that will be placed on them by the negative-stiffness-producing mechanism 40. Additional flexures, namely, a third flexure 46 and fourth flexure 48, both located below the first flexure 42 and second flexure 44 are also used to develop the negative stiffness that will be used to cancel or nearly cancel the positive stiffness of the support spring 12. The isolator 10 includes a rigid support 50 which is attached to the base platform 16 and extends vertically. The rigid support 50 includes an upper rigid bock 51 and a lower rigid block 53 which are connected together to form the composite support 50. One end 52 of the first flexure 42 is attached to the top of this rigid support 50 as can best be seen in FIG. 2. The other end 54 of flexure 42 is, in turn, connected to one side 56 of the center hub plate 28. A spacer 58 can be placed between the end 54 of the flexure 42 and the center hub plate 28. Fasteners, such as screws 36, can be used to fasten the end 54 of the flexure 42 to the center hub plate 28 and the end 52 to the rigid support 50.

Figure 2:
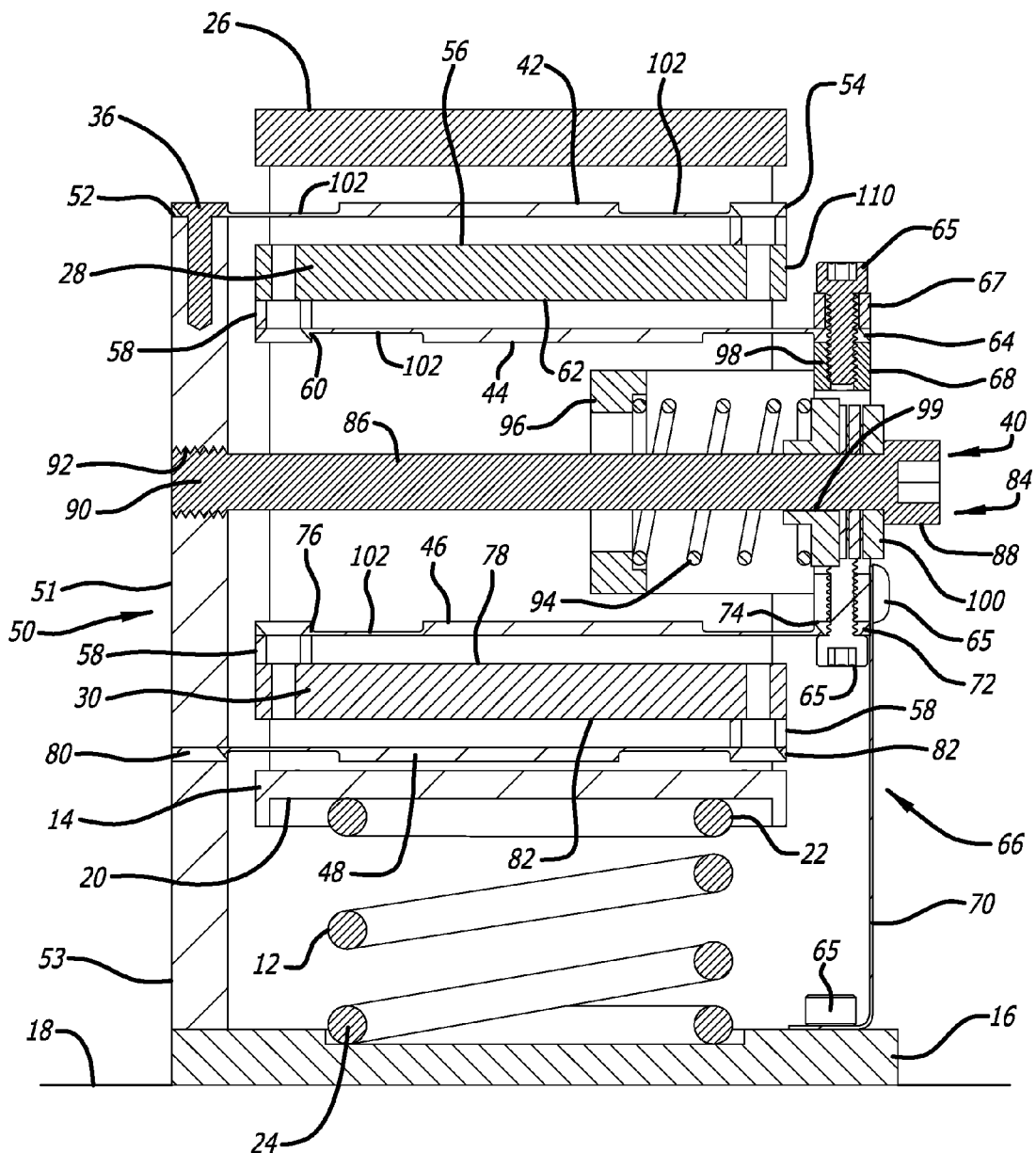
FIG. 2 is a cross sectional view of the compact vertical-motion isolator of FIG. 1.
Figure 3:
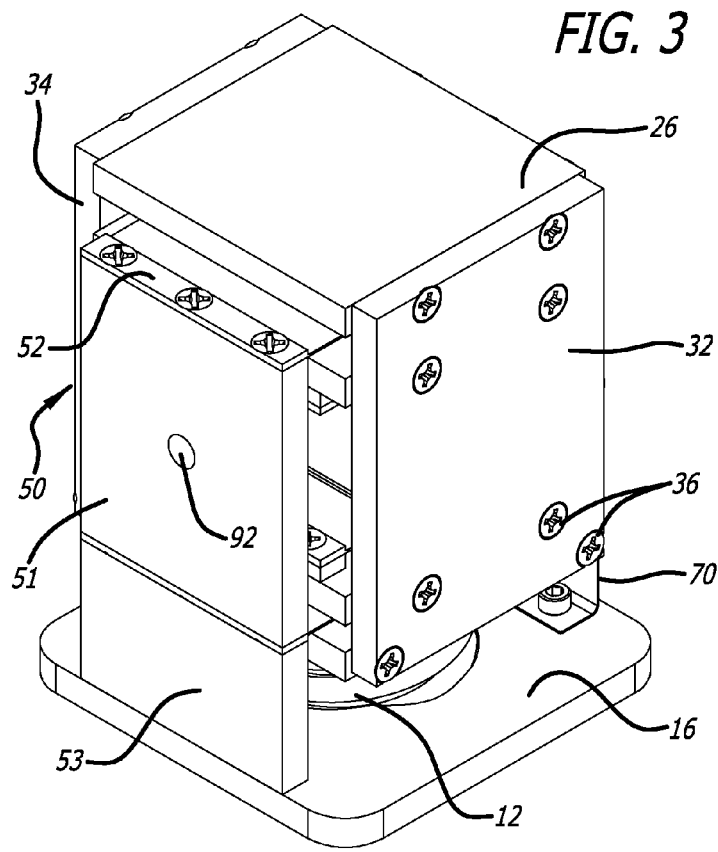
FIG. 3 is a perspective view showing the opposite side of the compact vertical-motion isolator of FIG. 1.
Figure 4:
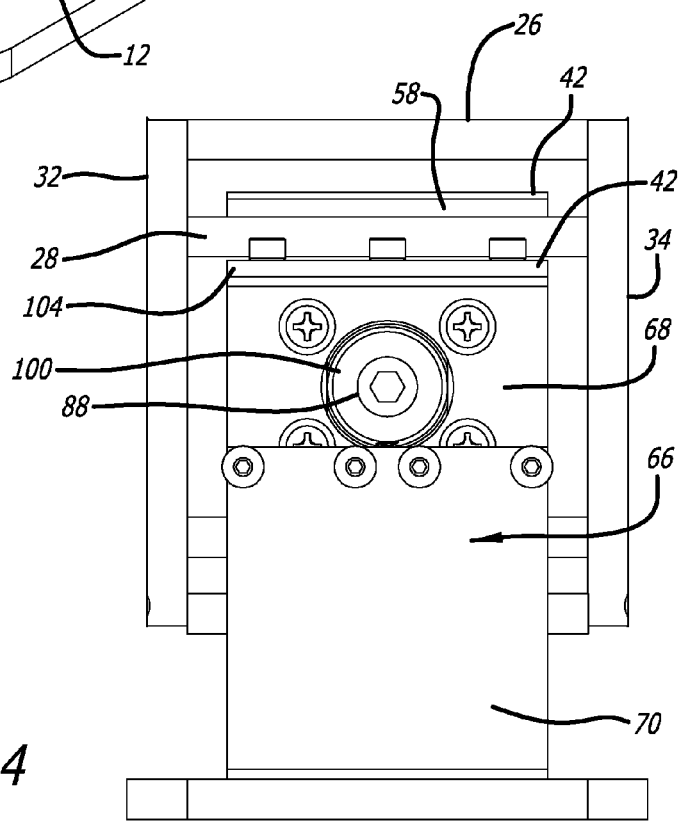
FIG. 4 is a side elevational view of the compact vertical-motion isolator of FIG. 1.
Figure 5:
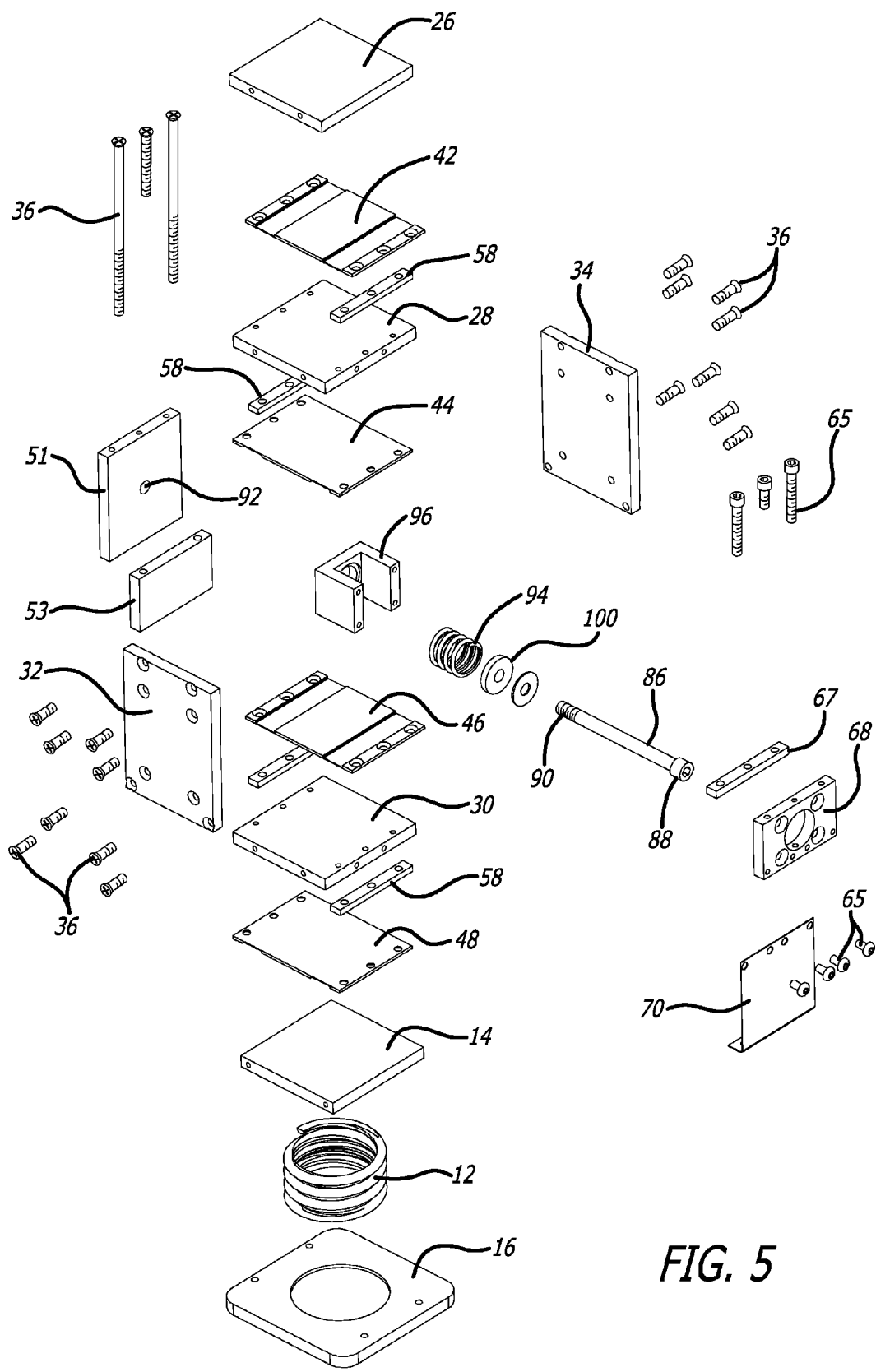
FIG. 5 is a blown up view showing the various components which form the compact vertical-motion isolator of FIG. 1.
Figure 6:
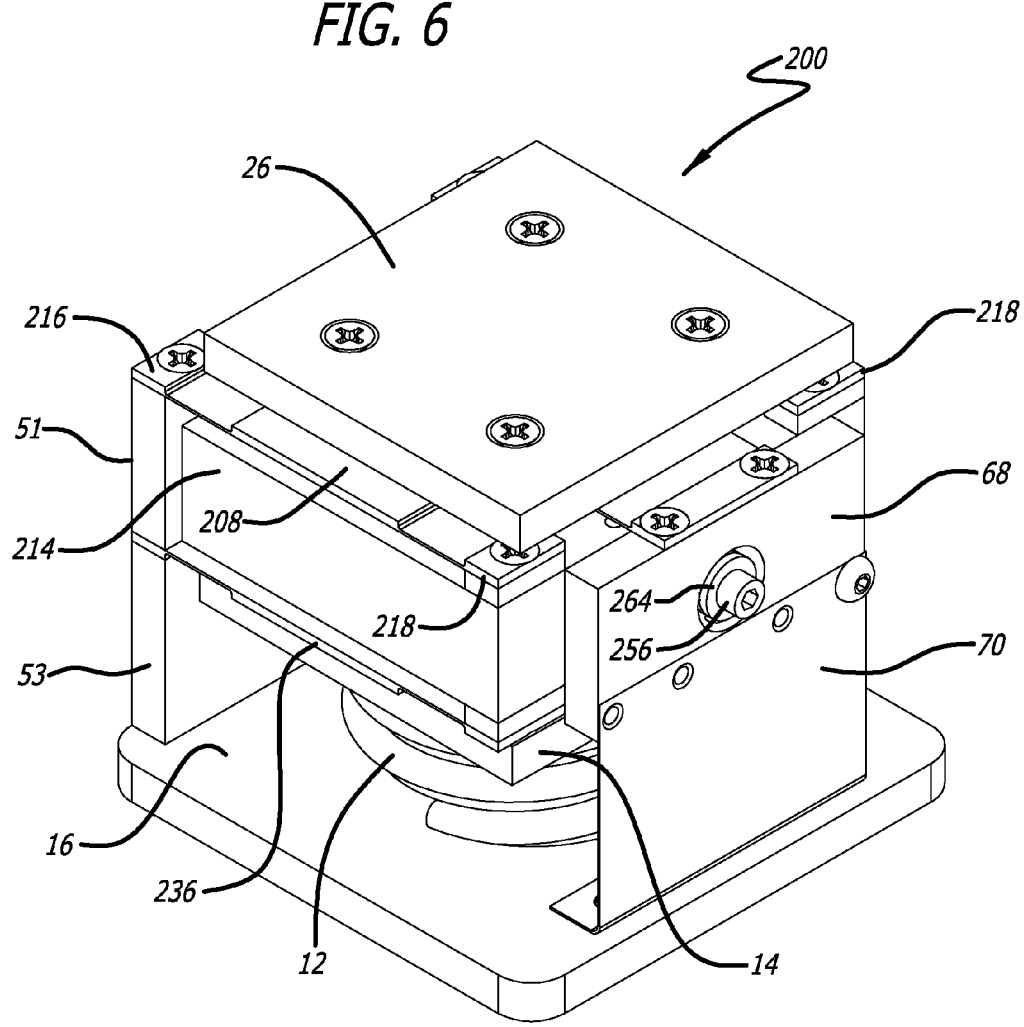
FIG. 6 is a perspective view of another embodiment of a compact vertical-motion vibration isolator made in accordance with the present invention.
Figure 7:
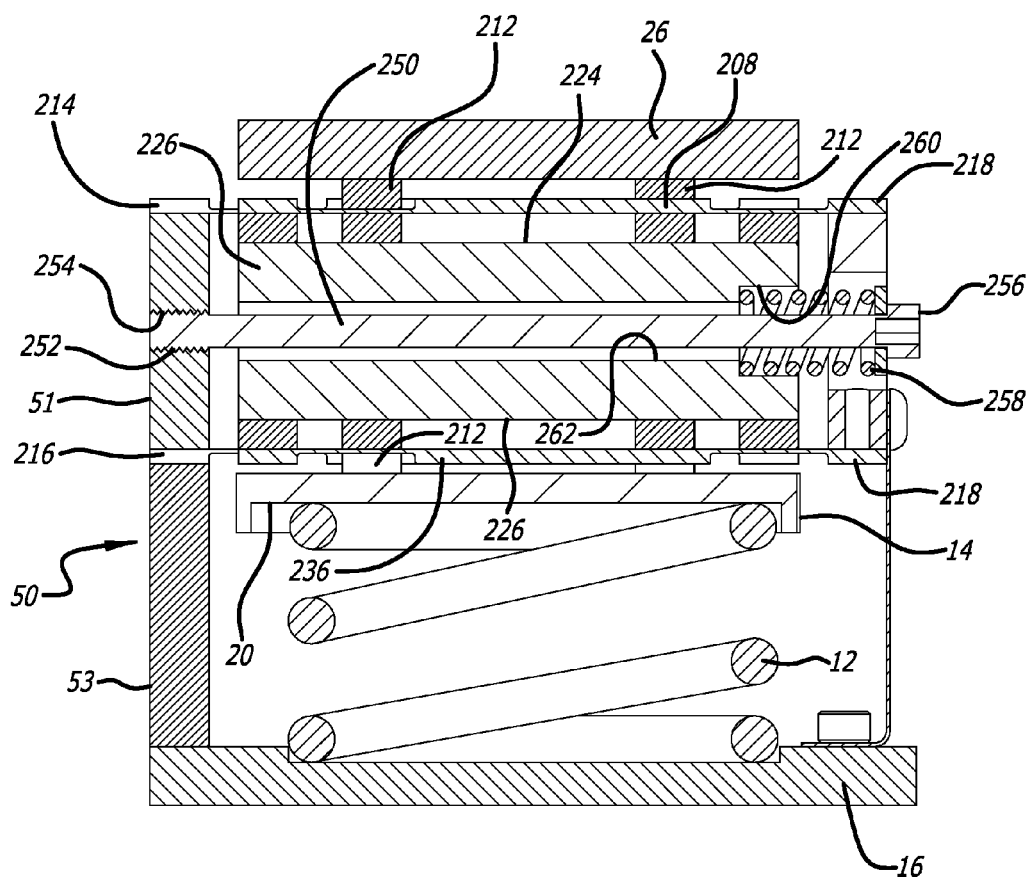
FIG. 7 is a cross sectional view of the compact vertical-motion isolator of FIG. 6.

An end 60 of a second flexure 44 is attached to the opposite side 62 of the center hub plate 28 as is shown in FIG. 2. Again, a spacer 58 can be placed between the end 60 and the center hub plate 28. The opposite end 64 of the second flexure 44 is attached to an upright flexure assembly 66 which includes a loaded flexure block 68 which is attached to a side flexure 70. As can be seen in FIG. 2, the end 64 of flexure 44 is connected to the top of the loaded flexure block 68 via fasteners such as socket screws 65. A compression plate 67 can be mounted between the head of the screws 65 and the block 68 to place a uniform compressive force on the end 64 of the flexure 44 to mount it in place. This side flexure 70 is attached to the base platform 16 via fasteners such as socket screws 65. The composite flexure assembly 66 is designed to support the components making up the negative-stiffness-producing mechanism 40. This side flexure 70 is designed to provide some flexing when the flexures 42-48 bend as the payload and the center hub move vertically and the flexures shorten or lengthen slightly in their axial or compressed direction.

The stacked placement of the first flexure 42 with respect to the second flexure 44 allows the size of the isolator to be more compact since the lengths of these flexures 42 and 44 overlap each other. In this regard, these flexures 42 and 44 are said to "stacked" relative to each other thus allowing each flexure to substantially overlap the length of each of the other flexures. This stacked arrangement still allows the flexures 42 and 44 to be operatively connected to one another so that the negative-stiffness-producing mechanism can still simultaneously compress each flexure 42 and 44 to exceed its point of elastic instability and remove stiffness from the support spring 12.

One end 72 of the third flexure 46 is connected to lower edge 74 of the loaded flexure block 68. The other end 76 is attached to one side 78 of the second center hub plate 30. Again, a spacer 58 can be placed between the end 76 and the plate 30. One end 80 of the fourth flexure 48 is, in turn, attached to the rigid support 50 at the location where the upper rigid block 51 is attached to the lower rigid block 53. Long screws 36 can be used to connect the upper rigid block 51 to the lower rigid block 53 which will maintain the end 80 of flexure 48 mounted therebetween. The opposite end 82 of the fourth flexure 48 is, in turn, connected to the opposite side 82 of the center hub plate 30.

Again, the stacked placement of the third flexure 46 with respect to the fourth flexure 48 allows the size of the isolator to be more compact since the lengths of these flexures 46 and 48 overlap each other. The third and fourth flexures 46 and 48 are also spaced apart vertically from the first and second flexures 42 and 44 to maintain all of the flexures in a "stacked" arrangement so that the length of each flexure substantially overlaps the lengths of each of the other flexures. All of these flexures 42-48 can be simultaneously compressed by the negative-stiffness-producing mechanism to exceed their point of elastic instability.

The compressed flexures 42-48 are operatively connected to the center hub assembly 38 and provide the needed negative stiffness to cancel or nearly cancel the stiffness associated with the support spring 12. A particular mechanism that can be used to compressively load these flexures 42-48 will be described below. The negative-stiffness-producing mechanism operates in the same manner as the particular mechanisms disclosed in my previous patents, particularly, U.S. Pat. Nos. 5,669,594 and 5,833,204.

The negative-stiffness-producing mechanism 40 includes a loading mechanism 84 for imparting the compressive force to the flexures 42-48 which includes a negative-stiffness screw 86 which has a screw head 88 mounted at the loaded flexure block 68 and its other end 90 threadingly engaged with a threaded opening 92 formed in the rigid support 50. The mechanism 84 includes a negative-stiffness spring 94 which is housed within a negative-stiffness spring bridge 96 which is fastened to the face 98 of the loaded flexure block 68 by screws 36. The negative-stiffness screw 86 is designed to extend through an opening 99 located in the loaded flexure block 68 with its screw head 88 engaging a thrust washer 100 disposed between the upper rigid block 68. In use, the negative-stiffness screw 86 is rotated a sufficient amount to develop a compressive force (via negative-stiffness spring 94) on the flexures 42-48 allowing them to develop the negative-stiffness effect which cancels or nearly cancels the positive stiffness associated with the support spring 12. This arrangement of a negative-stiffness screw 86, negative-stiffness spring 94 and negative-stiffness spring bridge 96 is just one of a number of mechanisms that could be used to load the flexures 42-48.

Each flexure 42-48 includes a notch 102 machined or otherwise formed in close proximity to each of their ends. These notches 102 reduce the bending stiffness of the flexure. Preloading of the flexures and fine tuning of the load to adjust the negative-stiffness effect are accomplished by simply turning the negative-stiffness screw 86.

The vertical-motion isolator 10 may include a worm gear assembly lift mechanism (not shown) that raises or lowers the lower end 24 of the support spring 12 to accommodate changes in weight load on the isolator. A suitable worm gear assembly lift is disclosed in U.S. Pat. Nos. 5,669,594 and 5,833,204.

Referring now to FIGS. 6-10, another embodiment of a compact vertical-motion isolator 200 is shown. In this particular embodiment, the vertical-motion isolator 200 utilizes many of the same components utilized in the embodiment of FIGS. 1-5. Similar components will be marked with similar reference numbers. The embodiment of FIGS. 6-10 basically differs from the previous embodiment by eliminating one of the center hub plates 28 or 30, by replacing the center hub vertical plates 32 and 34 with vertical spacers which connect the various plates of the center hub assembly together, and by using a different arrangement of the negative-stiffness flexures to reduce the width of the isolator. The arrangement of the flexures in the embodiment of FIGS. 6-10 positions the flexures in a lateral or side-by-side direction so that they overlap in their length direction in order to reduce the overall length of the compressed flexures. Multiple flexures are used by adding them in the lateral or side-by-side arrangement rather than stacking them one above the other as in the embodiment of FIGS. 1-5. In both embodiments the flexures are arranged so that the length of each flexure substantially overlaps the length of each of the other flexures. As in the embodiment of FIGS. 1-5, one end of each of the compressed flexures in the embodiment of FIGS. 6-10 connects to a center hub plate and the other end of each flexure connects either to a rigid support or connects to a flexure assembly that provides some flexibility in the compressed direction of the flexures as they shorten or lengthen slightly as the center hub moves vertically.

Figure 8:
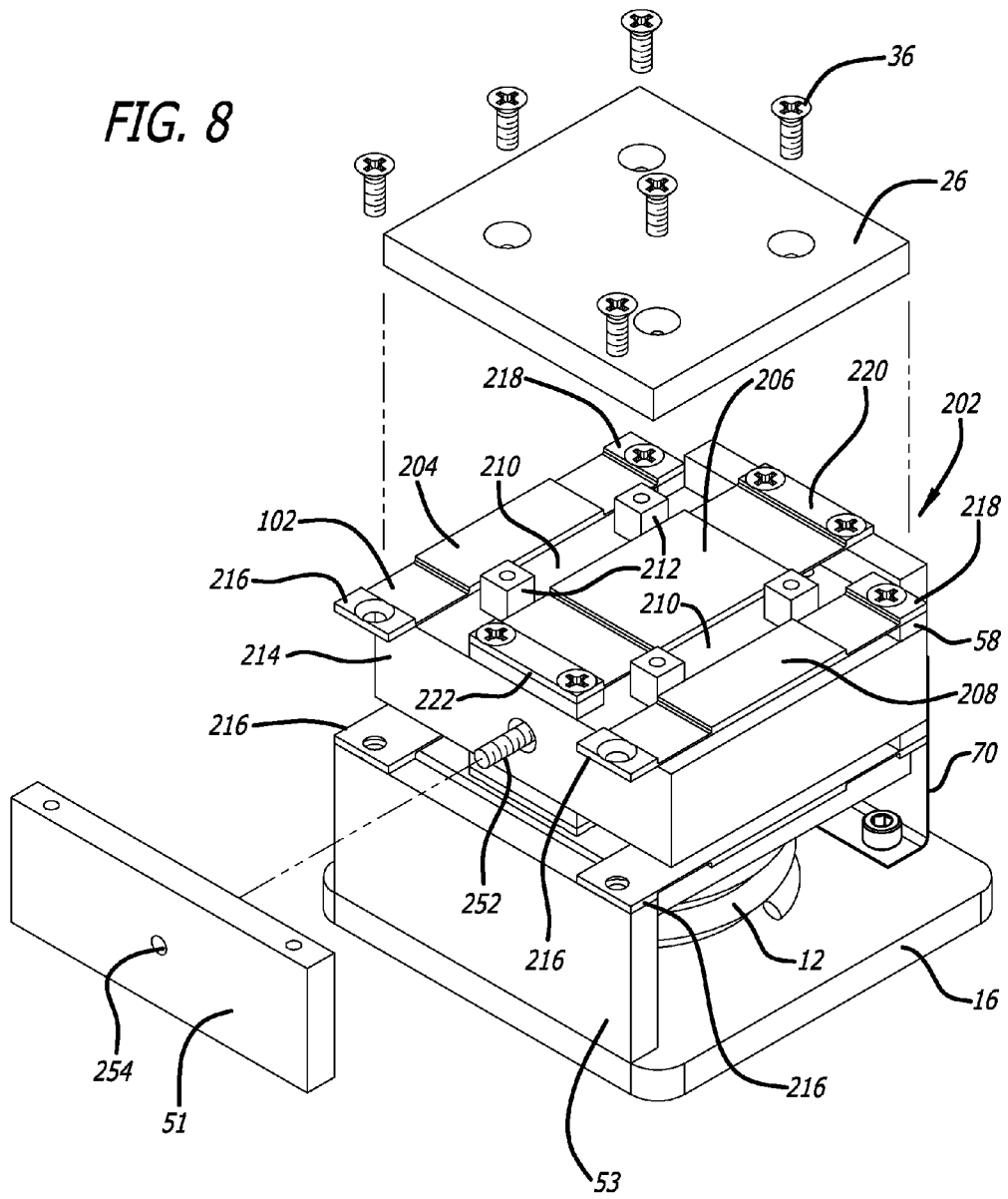
FIG. 8 is a perspective view showing the compact vertical-motion isolator of FIG. 6 with plates removed to better shown the arrangement of flexures.
Figure 9:
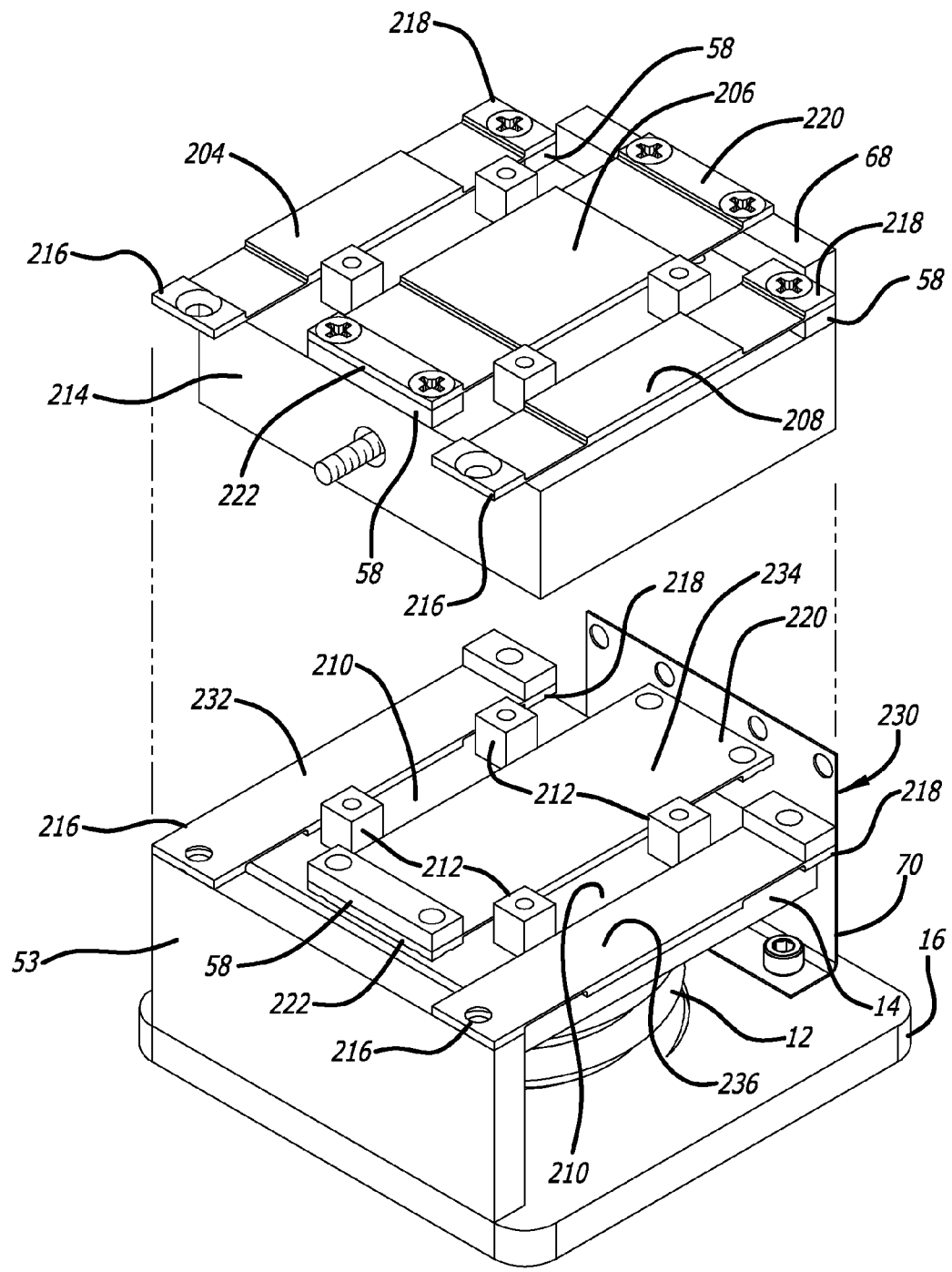
FIG. 9 is a perspective view showing the compact vertical-motion isolator of FIG. 6 with components removed to better shown the arrangement of flexures.
Figure 10:
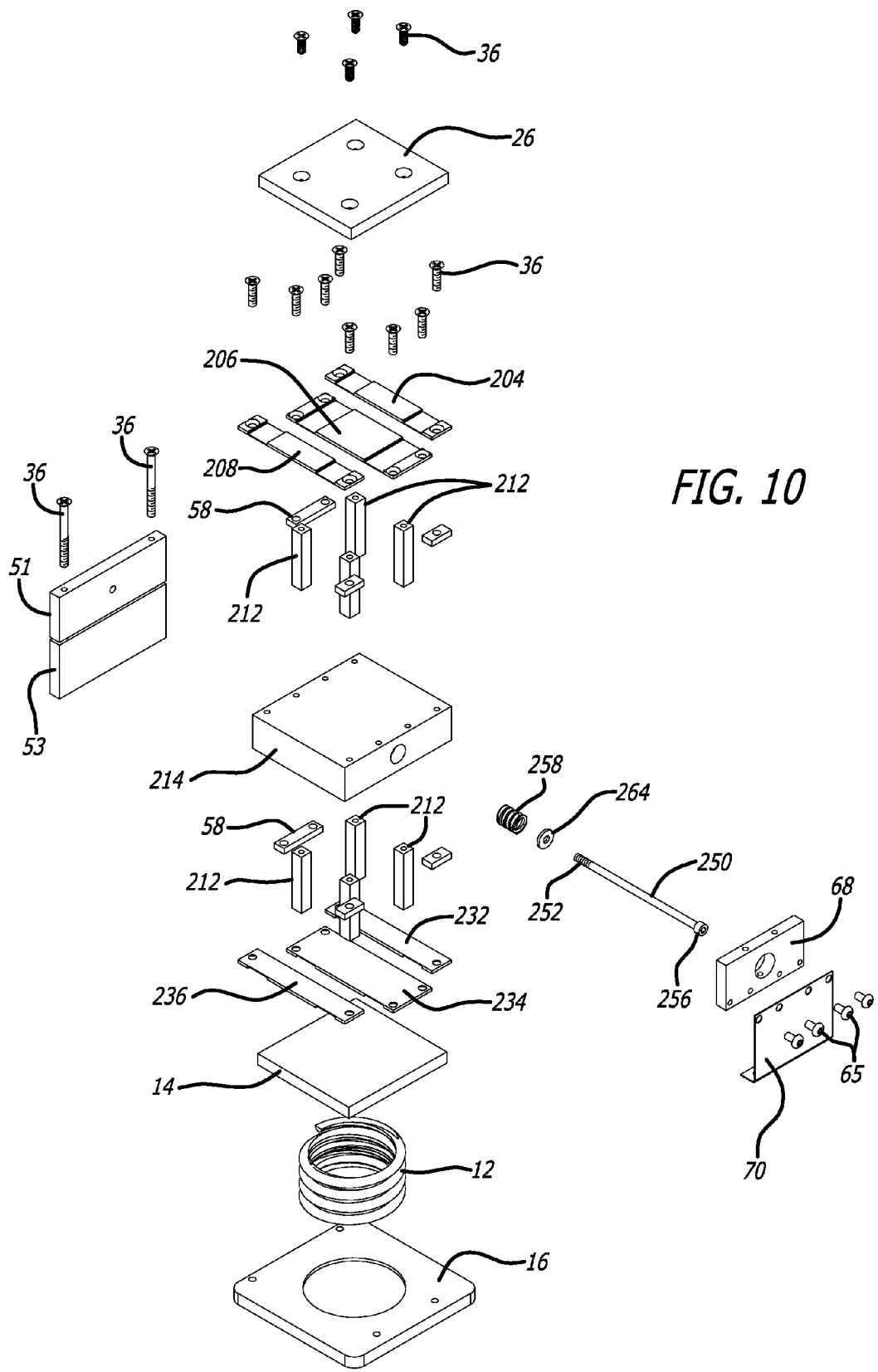
FIG. 10 is a blown up view showing the various components which form the compact vertical-motion isolator of FIG. 6.

As can be seen in FIGS. 6-9, three pairs of flexures are connected to the top and bottom surfaces of the center hub plate 214. Referring specifically to FIGS. 8 and 9, the first pair of flexures 206 and 234 is connected at the center of the center hub plate. These flexures 206 and 234 are referred to as the "center flexures." Two more pairs of flexures 208, 236 and 204, 232 are spaced laterally toward the front and back of the isolator from the center flexures 206 and 234. These flexures are referred to as outside flexures. The lateral or side-to-side spacing of the side flexure pairs 208, 236 and 204, 232 from the center flexure pair 206, 234 create spaces 210 through which a set of vertical spacers 212 are mounted to connect the top plate 26 to the center hub plate 214.

Each of the outside flexures 204, 208, 232 and 236 have one end 216 which is attached to the upper rigid support 51. In FIG. 8, the upper rigid support 51 is shown drawn away from the isolator 200 to better show the ends of the various flexures. In FIG. 9, the upper rigid support 51 has been removed completely to provide better visualization of the components forming the isolator. Each of the outside flexures 204, 208, 232 and 236 further include a second end 218 which is, in turn, attached to one side of the center hub plate 214. The top outside flexures 204, 208 have second ends 218 which are attached to the top side 224 of the center hub plate 214 (see FIG. 7). The bottom outside flexures 232, 236 have second ends 218 which are attached to the bottom face 226 of the center hub plate 214. Flexure spacers 58 can be placed between the ends 218 and the center hub plate 214.

One end 220 of the center flexure 206 is, in turn, attached to the loaded flexure block 68 and its other end 222 is attached to the center hub plate 214. A flexure spacer 58 is placed between the end 222 and the center hub plate 214. The other center flexure 234 also has one end 220 attached to the loaded flexure block 68 and its second end 222 attached to the bottom face 226 of the center hub plate 214.

As can be best seen in FIG. 8, the vertical spacers 212 are positioned in the spaces 210 formed between the flexures to connect the top mounting plate 26 to the side 224 of the center hub plate 214. Likewise, vertical spacers 212 are placed between the spaces of the flexures 232-236 to attach the upper spring support 14 to bottom side 226 of the center hub plate 214.

The negative-stiffness-producing mechanism 40 used with the embodiment of FIGS. 6-10 includes a negative-stiffness screw 250 which has one threaded end 252 threadingly engaged with a threaded opening 254 at the upper rigid support 51 and its screw head 256 attached at the loaded flexure block 68. The mechanism 240 includes a negative-stiffness spring 258 which is housed within a recess 260 formed in the center hub plate 214. The negative-stiffness screw 250 is designed to extend through an opening 262 formed in the center hub plate 214. A thrust washer 264 can be placed between the head of the die spring screw 250 and the loaded flexure block 68. A recessed space could be cut into the loaded flexure block 68 to receive the thrust washer 264. In use, the negative-stiffness screw 250 is rotated a sufficient amount to develop a compressive force which acts on each set 202 and 230 of flexures 204-208 and 232-236. This compressive force loads the flexures allowing them to develop the negative-stiffness effect which acts to cancel the positive stiffness associated with the support spring 12. This arrangement of a negative-stiffness screw and negative-stiffness spring is just one of a number of ways to load the flexures.

This vertical-motion isolator 200 may also include a worm gear assembly lift mechanism (not shown) that raises or lowers the ends of the support spring 12 to accommodate changes in weight load on the isolator. A suitable worm gear assembly lift is disclosed in U.S. Pat. Nos. 5,669,594 and 5,833,204.

The elements making up the present structure can be made from common structural materials such as steel and aluminum alloys, and other structural materials having suitable strength and elastic properties can also be used.

While particular forms of the invention have been illustrated and described, it will be apparent that various modifications can be made without departing from the spirit and scope of the invention. Accordingly, it is not intended that the invention be limited, except by the attached claims.

I claim:

1. A vibration isolator having force-supporting capability in a vertical direction for supporting an object in an equilibrium position relative to a base while suppressing transmission of vibratory motion between the object and the base comprising:
   a support spring for providing positive stiffness in the vertical direction and having force-supporting capability in the vertical direction for supporting the object; and
   a mechanism for producing negative stiffness in the vertical direction operatively connected with the support spring, wherein the support spring and the negative-stiffness-producing mechanism combine to produce the low vertical stiffness, the negative-stiffness-mechanism including a plurality of compressed flexures, each compressed flexure having a particular length in the compressed direction of the flexure and being oriented in a horizontal direction, wherein the plurality of compressed flexures are positioned relative to each other such that the length of each compressed flexure overlaps the length of each of the other compressed flexures.

2. The vibration isolator of claim 1, wherein the negative-stiffness-producing mechanism includes a mechanism for placing the compression on each of the plurality of compressed flexures simultaneously.

3. The vibration isolator of claim 1, wherein at least some of the plurality of compressed flexures are positioned in a stacked arrangement.

4. The vibration isolator of claim 1, wherein a center hub assembly operatively connects the plurality of compressed flexures of the negative-stiffness-producing mechanism with the support spring.

5. The vibration isolator of claim 4, wherein each length of each compressed flexure overlaps the center hub assembly.

6. The vibration isolator of claim 5, wherein the center hub assembly includes a horizontally oriented center hub plate having a top side and a bottom side, wherein at least one of the plurality of compressed flexures is mounted to the top side of the center hub plate and at least one of the plurality of compressed flexures is mounted to the bottom side of the center hub plate.

7. The vibration isolator of claim 6, wherein the center hub assembly includes an upper spring support which contacts one of the ends of the support spring, the upper spring support and the center hub plate being connected together.

8. The vibration isolator of claim 7, wherein a pair of vertical plates is connected to each of the upper spring support and the center hub plate.

9. The vibration isolator of claim 8, further including a top mounting plate, wherein the pair of vertical plates is connected to each of the upper spring support, the center hub plate and the top mounting plate.

10. A vibration isolator having force-supporting capability in a vertical direction for supporting an object in an equilibrium position relative to a base while suppressing transmission of vibratory motion between the object and the base comprising:
 a support spring for providing positive stiffness in the vertical direction and having force-supporting capability in the vertical direction for supporting the object; and
 a mechanism for producing negative stiffness in the vertical direction operatively connected with the support spring, wherein the support spring and the negative-stiffness-producing mechanism combine to produce the low vertical stiffness, the negative-stiffness-mechanism including at least two compressed flexures, wherein the at least two compressed flexures overlap one another in the compressed direction of the flexures so that all of the at least two compressed flexures in the negative-stiffness-producing mechanism occupy the same space in the compressed direction of the flexures.

11. The vibration isolator of claim 10, wherein all of the compressed flexures are oriented in a horizontal direction.

12. The vibration isolator of claim 10, wherein the negative-stiffness-producing mechanism includes a mechanism for placing the compression on all of the compressed flexures simultaneously.

13. The isolator of claim 12, wherein the compressed flexures are stacked one above the other.

14. The isolator of claim 10, wherein a center hub assembly operatively connects the compressed flexures of the negative-stiffness-producing mechanism with the support spring.

15. The vibration isolator of claim 14, wherein the compressed flexures of the negative-stiffness-producing mechanism and the center hub assembly overlap each other in the compressed direction of the flexures so that the compressed flexures and the center hub assembly occupy the same space in the compressed direction of the flexures.

16. The vibration isolator of claim 15, wherein the center hub assembly includes a horizontally oriented center hub plate having a top side and a bottom side, wherein at least one compressed flexure is mounted to the top side of the center hub plate and at least one compressed flexure is mounted to the bottom side of the center hub plate.

17. The vibration isolator of claim 16, wherein the center hub assembly includes an upper spring support which contacts one end of the support spring and a center hub plate, the upper spring support and the center hub plate being connected together.

18. The vibration isolator of claim 17, wherein a pair of vertical plates is connected to each of the upper spring support and the center hub plate.

19. The vibration isolator of claim 18, further including a top mounting plate, wherein the vertical plates are connected to each of the upper spring support, the center hub plate and the top mounting plate.

20. The vibration isolator of claim 10, wherein four compressed flexures are utilized and each compressed flexure overlap one another in the compressed direction of the flexures so that all of the compressed flexures in the negative-stiffness-producing mechanism occupy the same space in the compressed direction of the flexures.

\* \* \* \* \*